(12) United States Patent
Abe et al.

(10) Patent No.: US 8,199,402 B2
(45) Date of Patent: Jun. 12, 2012

(54) PORTABLE SCREEN ASSEMBLY

(75) Inventors: Teruyuki Abe, Tokyo (JP); Kazuharu Seki, Tokyo (JP)

(73) Assignee: Izumi-Cosmo Company, Limited, Osaka (JP)

(*) Notice: Subject to any disclaimer, the term of this patent is extended or adjusted under 35 U.S.C. 154(b) by 0 days.

(21) Appl. No.: 12/936,774

(22) PCT Filed: Apr. 24, 2009

(86) PCT No.: PCT/JP2009/058124
§ 371 (c)(1),
(2), (4) Date: Oct. 7, 2010

(87) PCT Pub. No.: WO2009/133809
PCT Pub. Date: Nov. 5, 2009

(65) Prior Publication Data
US 2011/0026114 A1 Feb. 3, 2011

(30) Foreign Application Priority Data

May 2, 2008 (JP) ............................... P 2008-120425
Feb. 9, 2009 (CN) ....................... 2009 2 0000369 U

(51) Int. Cl.
*G03B 21/56* (2006.01)
(52) U.S. Cl. ......... 359/461; 359/443; 248/560; 248/919
(58) Field of Classification Search .................... 359/461
See application file for complete search history.

(56) References Cited

U.S. PATENT DOCUMENTS

| | | | | |
|---|---|---|---|---|
| 3,850,307 A * | 11/1974 | Motoda | ......................... | 212/237 |
| 6,249,377 B1 * | 6/2001 | Takamoto et al. | ............ | 359/461 |
| 6,297,905 B1 * | 10/2001 | Takamoto et al. | ............ | 359/461 |
| 6,334,605 B1 * | 1/2002 | Kikuchi | ........................ | 254/126 |
| 2006/0080918 A1 | 4/2006 | Clubbe | | |

(Continued)

FOREIGN PATENT DOCUMENTS

EP 0 901 038 3/1999

(Continued)

OTHER PUBLICATIONS

European Search Report (in English language) issued Apr. 7, 2011 in corresponding European Patent Application No. 09738746.

(Continued)

*Primary Examiner* — Clayton E LaBalle
*Assistant Examiner* — Kevin Butler
(74) *Attorney, Agent, or Firm* — Wenderoth, Lind & Ponack, LLP

(57) ABSTRACT

A portable screen assembly that is lighter in weight and easier to handle. The assembly includes a casing, a spring-biased roll rotatably mounted to the casing, a screen bonded at one end thereof to a top bar and wound around the spring-biased roll when in storage, and an expanding and contracting device having one end rotatably mounted to a mounting member mounted to the top bar and the other end rotatably mounted to the casing. The expanding and contracting device is a half-pantograph type expanding and contracting device having a first arm, a second arm and a third arm arranged in an extended plane parallel to the extended screen. The second arm includes two or more mutually parallel sub arms provided to be mutually parallel in the extended plane. The two or more sub arms are connected to the first arm and the second arm so as to form a parallel link.

12 Claims, 6 Drawing Sheets

U.S. PATENT DOCUMENTS

2006/0209406 A1  9/2006  Choi

FOREIGN PATENT DOCUMENTS

| | | |
|---|---|---|
| EP | 0 984 321 | 3/2000 |
| GB | 376 385 | 7/1932 |
| JP | 11-142974 | 5/1999 |
| JP | 2000-131766 | 5/2000 |
| WO | 2006/029500 | 3/2006 |

OTHER PUBLICATIONS

International Search Report issued Jun. 2, 2009 in International (PCT) Application No. PCT/JP2009/058124.

* cited by examiner

PORTABLE SCREEN ASSEMBLY

BACKGROUND OF THE INVENTION

1. Field of the Invention

The present invention relates generally to a screen for displaying, on an enlarged scale, an image projected by a projecting device such as a projector, and in particular but not exclusively to a portable screen assembly that is easy to carry and can be installed at an optional location such as, for example, on a floor, a table or the like.

2. Description of the Related Art

An image projected by a projector or, in some cases, a projection TV set is generally displayed, on an enlarged scale, on a reflection type screen or on a transmission type screen. Of such screens, some are generally accommodated in a housing mounted on a ceiling or a side wall, and are electrically or manually extended as occasion demands.

Recently, along with increase of meetings in companies or offices, there is raised an increasing demand for a small, light and simply-structured portable screen assembly that can be carried easily with a projector and that can be installed on a floor, a meeting desk or a table in a meeting room to project an image from the projector thereon. Under such circumstances, the present applicant has proposed a small, light and simply-structured portable screen assembly in which a screen wound around a spring-biased-roll is stored in a storage case, and in which a pantograph is used as an expanding and contracting means for the screen (JP-A No. 2000-131766).

SUMMARY OF THE INVENTION

It is an object of the present invention to provide a portable screen assembly that is lighter in weight and easier to handle than a conventional screen assembly.

To solve the above problems, there is provided a portable screen assembly of the present invention including a casing; a spring-biased roll rotatably mounting to the casing; a screen bonded at one end thereof to a top bar and wound around the spring-biased roll when in storage; and an expanding and contracting means having one end rotatably mounted to an mounting member mounted to the top bar and the other end rotatably mounted to the casing, wherein the expanding and contracting means is a half-pantograph type expanding and contracting means having a first arm, a second arm, and a third arm arranged in an extended plane parallel to the extended screen, the second arm including two or more sub arms which are mutually parallel to each other and provided to be parallel to the extended plane, the two or more sub arms being connected to the first arm and the third arm so as to form a parallel link.

In a portable screen assembly according to a first aspect of the present invention, one end of the second arm of the expanding and contracting means is preferably rotatably connected to a first connecting portion in which one end of the first arm is secured, and the other end of the second arm is preferably rotatably connected to a second connecting portion in which one end of the third arm is secured, and one ends of the sub arms are preferably rotatably connected to the first connecting portion by separate connecting axes, respectively, and the other ends of the sub arms are preferably rotatably connected to the second connecting portion by separate connecting axes, respectively.

In the first aspect, the first connecting portion preferably includes a pair of first sandwiching plates parallel to each other sandwiching both side surfaces of one end of the first arm, and the second connecting portion preferably includes a pair of second sandwiching plates parallel to each other sandwiching both side surfaces of one end of the third arm.

Moreover, in the first aspect, at least one of the first sandwiching plates and the second sandwiching plates each preferably has a raised portion on an abutment surface with the sub arms so that one ends of the sub arms is in abutment with the raised portion to generate a friction force when rotating the sub arms.

Moreover, in the first aspect, the expanding and contracting means preferably has a height holding means engaged with a part of the expanding and contracting means. The height holding means is preferably a gas spring having one end engaged with the second arm and the other end engaged by the first arm.

Moreover, in the first aspect, the two or more sub arms are preferably connected by a link member so as to enable mutual parallel movement.

In a portable screen assembly according to a second aspect of the present invention, one end of the second arm of the expanding and contracting means is preferably rotatably connected to one end of the first arm, and the other end of the second arm is preferably rotatably connected to one end of the third arm, and one ends of the sub arms are preferably rotatably connected to the first arm by separate connecting axes, respectively, and the other ends of the sub arms are preferably rotatably connected to the second arm by separate connecting axes, respectively.

In the second aspect, the expanding and contracting means preferably has a height holding means engaged with a part of the expanding and contracting means. Also, the height holding means is preferably a gas spring having one end engaged with the second arm and the other end engaged with the first arm.

Moreover, in the second aspect, the two or more sub arms are preferably connected by a link member so as to enable mutual parallel movement.

Moreover, in the portable screen assembly according to a third embodiment of the present invention, one end of the second arm of the expanding and contracting means is preferably rotatably connected to a first connecting portion in which one end of the first arm is secured, and the other end of the second arm is preferably rotatably connected to a second connecting portion in which one end of the third arm is secured, and the other end of the first arm is preferably rotatably connected to a supporting member at an intermediate portion of the casing while the other end of the third arm is preferably rotatably connected to the mounting member mounted to an intermediate portion of the top bar, and when storing the screen, the mounting member is preferably engaged with the casing to fix the top bar in the casing.

In the third aspect, the supporting member is preferably mounted on a back face side at the intermediate portion of the casing while an engaging member is preferably mounted on a front face side at the intermediate portion of the casing, and the mounting member is preferably engaged with the supporting member and the engaging member to lock the top bar to the casing.

Moreover, in the third aspect, the first connecting portion preferably includes a pair of first sandwiching plates parallel to each other sandwiching both side surfaces of one end of the first arm, and the second connecting portion preferably includes a pair of second sandwiching plates parallel to each other sandwiching both side surfaces of one end of the third arm.

Moreover, in the third aspect, the expanding and contracting means preferably has a height holding means engaged with a part of the expanding and contracting means. Also, the height holding means is preferably a gas spring having one end engaged with the second arm and the other end engaged with the first arm.

According to the portable screen assembly of the present invention, by using an expanding and contracting means having a half-pantograph type structure, it is possible to provide a portable screen assembly that is lighter and easier to handle since the number of parts can be further reduced than in the case of using a conventional expanding and contracting means having a pantograph structure.

In the portable screen assembly according to the first aspect of the present invention, the first arm, the second arm, and the third arm connected via the connecting portions are used as the expanding and contracting means. By using the plural sub arms for the intermediate second arm, and rotatably connecting the ends of the sub arms to the connecting portions by separate connecting axes, downward movement of the screen can be controlled by rotational resistances of the respective sub arms. Accordingly, it is possible to provide a portable screen assembly that is easy to handle by enabling easy height adjustment of the screen and lowering the possibility of falling of the screen.

Moreover, in the portable screen assembly according to the second aspect of the present invention, the first arm, the second arm, and the third arm connected via the connecting portions are used as the expanding and contracting means. By using the plural sub arms for the intermediate second arm, and rotatably connecting one ends of the sub arms to one end of the first arm by separate connecting axes, and rotatably connecting the other ends of the sub arms to one end of the third arm by separate connecting axes, downward movement of the screen can be positively controlled through rotational resistances of the respective sub arms. Accordingly, it is possible to provide a portable screen assembly that is easy to handle by enabling easy height adjustment of the screen and lowering the possibility of falling of the screen. Further, since no connecting portion is needed, further reduction in weight can be achieved.

Moreover, the portable screen assembly according to the third aspect of the present invention uses the expanding and contracting means having a half-pantograph type structure, the other end of the first arm is rotatably mounted to the supporting member at the intermediate portion of the casing, and the other end of the third arm is rotatably mounted to the mounting member mounted to the intermediate portion of the top bar, and when storing the screen, the mounting member is brought into engagement with the casing, thereby locking the top bar to the casing. Since the top bar acts as a cover body of the casing, still further reduction in weight is achieved. At the time of use, the screen can be stretched by simple operations of releasing engagement of the mounting member with the casing and pulling up the top bar, and thereby it is extremely easy to handle.

DETAILED DESCRIPTION OF THE PREFERRED EMBODIMENTS

Hereinafter, embodiments of the present invention will be described with reference to the drawings.

First Embodiment

Figure 1:
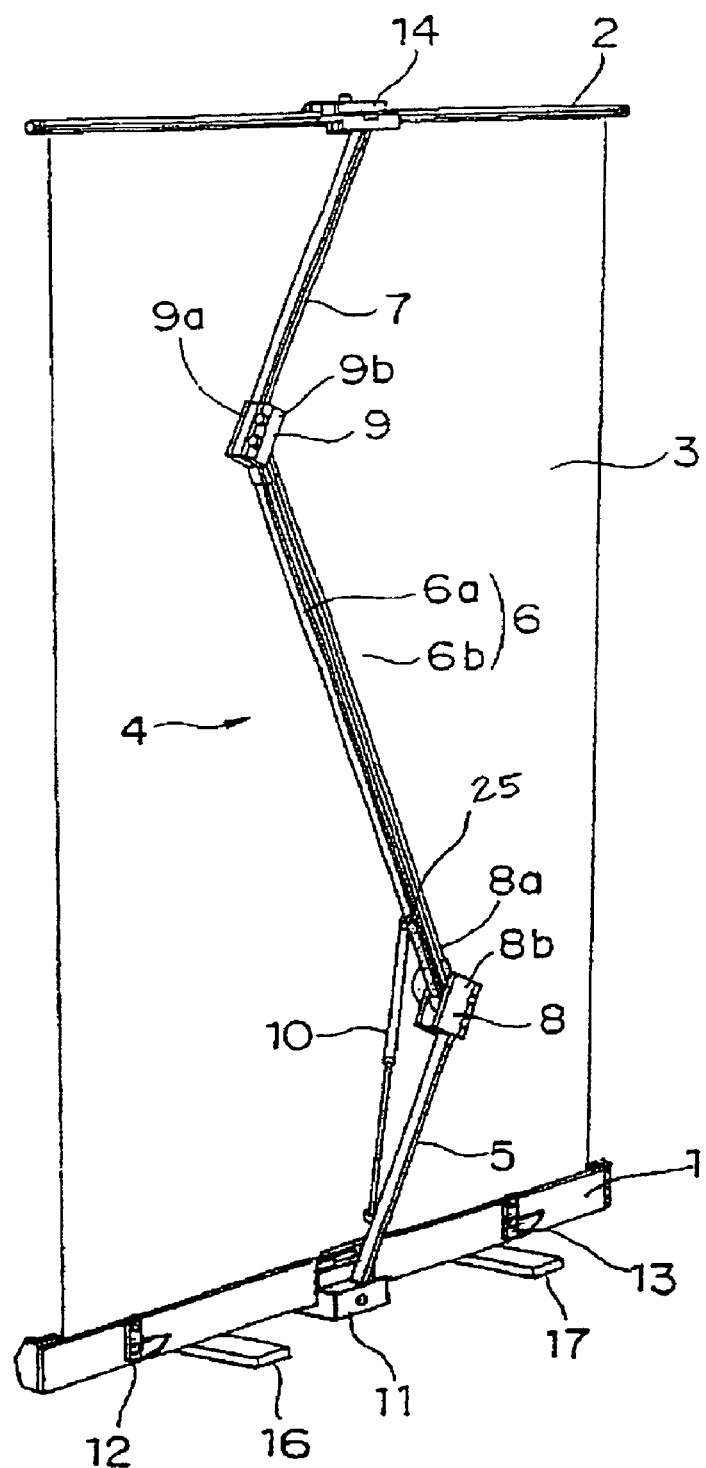
FIG. 1 is a back-side schematic perspective view showing an example of a portable screen assembly according to the present invention during use thereof.

FIG. 1 is a schematic perspective view showing an example of a portable screen assembly according to an embodiment of the present invention during use thereof and shows a back face in a case where a projector side is a front face. The portable screen assembly according to the present embodiment includes a casing 1, a spring-biased roll (not shown) mounted to the casing 1, a screen 3 extended between a top bar 2 and the spring-biased roll, a half-pantograph type expanding and contracting means 4 for extending the screen 3, and a height holding means 10 including a gas spring. Reference numerals 16, 17 denote support legs supporting the portable screen assembly when it is used. Reference numerals 12, 13 denote fixing members holding the folded expanding and contracting means 4 when the assembly is not used.

Figure 2:
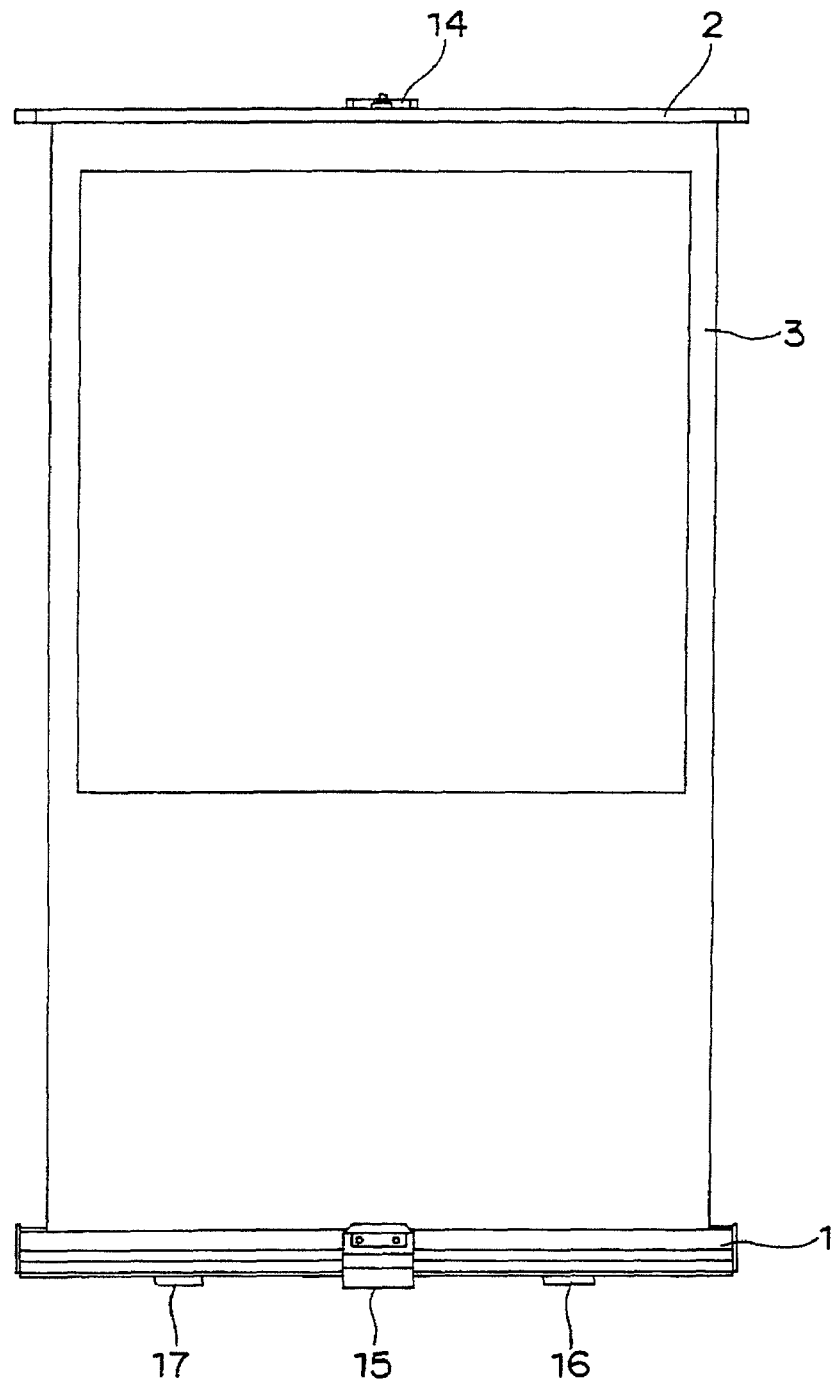
FIG. 2 is a schematic view showing an example of a structure of a front face side of the portable screen assembly in FIG. 1.

FIG. 2 is a schematic view showing an example of a portable screen assembly according to the embodiment of the present invention during use thereof and shows a state of a front face on the projector side. An engaging member 15 for fixing the top bar is mounted at the intermediate portion of the casing 1. When the expanding and contracting means 4 is folded for storing the screen 3, the engaging member 15 is engaged with a mounting member 14 and locks the top bar 2 to the casing 1. Here, the engaging member 15 also acts as a protecting member preventing the casing from being deformed by a load of the top bar. The engaging member 15 has to be provided at least on the upper portion on the front face at the intermediate portion of the casing. The engaging member 15 may be provided to cover the whole front face at the intermediate portion of the casing as shown in FIG. 2.

As shown in FIG. 1, the expanding and contracting means 4 has a half-pantograph type structure. The expanding and contracting means 4 constituted as follows can positively inhibit downward movement of the screen. One end of a first arm 5 is rotatably supported on a supporting member 11 at the intermediate portion of the casing 1. Thereafter, the other end of the first arm 5 is connected to a first connecting portion 8 while one ends of sub arms 6a, 6b of a second arm 6 as an intermediate arm are pivotally connected to the first connecting portion 8 by separate connecting axes, respectively. Thereafter, the other ends of the sub arms 6a, 6b are rotatably connected to a second connecting portion 9 by separate connecting axes. Thereafter, one end of a third arm 7 is connected to the second connecting portion 9 while the other end of the third arm 7 is rotatably supported with a U-shaped member (not shown) in the mounting member 14 mounted to the intermediate portion of the top bar 2. In this case, the first arm, the two sub arms constituting the second arm, and the third arm connected to one another are arranged in an extended plane parallel to the extended screen.

Hollow rectangular pipes made of aluminum can be used for the arms constituting the expanding and contracting means 4. The first connecting portion 8 includes a sandwiching member including a pair of sandwiching plates 8a, 8b connected to be parallel to each other so as to sandwich the arms, and the first connecting portion 8 is attached so as to sandwich and fix both side surfaces of one end of the first arm 5. The second connecting portion 9 includes a sandwiching member including a pair of sandwiching plates 9a, 9b connected to be parallel to each other so as to sandwich the arms, and the second connecting portion 9 is attached so as to sandwich and fix both side surfaces of one end of the third arm 7. Here, the pair of sandwiching plates constituting the first connecting portion are respectively arranged in separate extended planes parallel to the aforementioned extended plane in which the first, second, and third arms are arranged. Similarly, the pair of sandwiching plates constituting the second connecting portion are respectively arranged in separate extended planes parallel to the aforementioned extended plane in which the first, second, and third arms are arranged.

Figure 4:
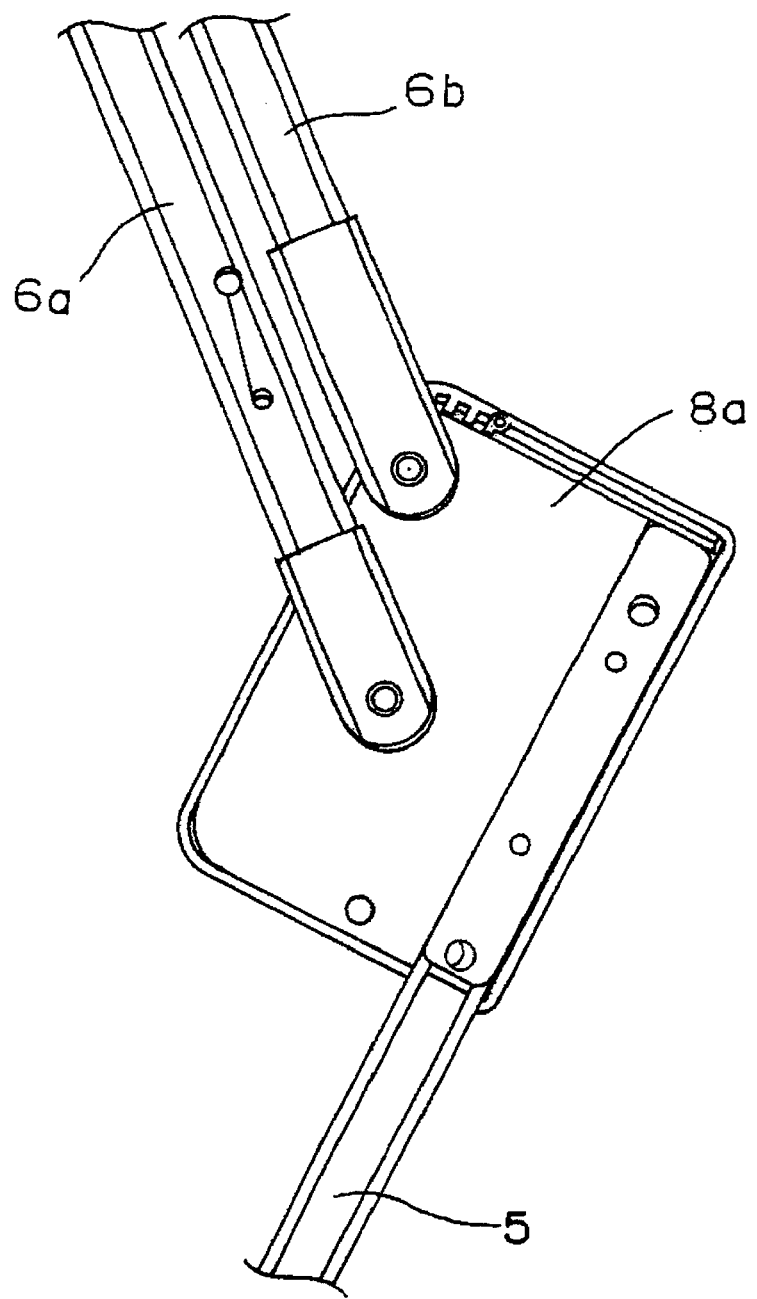
FIG. 4 is a schematic view showing an example of a structure of a connecting portion used in the portable screen assembly in FIG. 1.

Moreover, one ends of the sub arms 6a, 6b are connected to the first connecting portion by the separate connecting axes so as to pivot between the pair of first sandwiching plates 8a, 8b. FIG. 4 is a schematic view showing an example of a structure of the first connecting portion in an extended state and in a state where the first sandwiching plate 8b has been detached. The first arm 5 is fixed in the pair of first sandwiching plates 8a, 8b. On the other hand, the sub arms 6a, 6b are connected by the separate connecting axes, respectively, and rotate about the connecting axes between the pair of opposed first sandwiching plates 8a, 8b in a state of making both the side surfaces of the ends into contact with the pair of first sandwiching plates. Also, a structure of the second connecting portion is similar. The third arm is fixed in the pair of second sandwiching plates 9a, 9b. On the other hand, the sub arms 6a, 6b are connected by the separate connecting axes, respectively, and the sub arms 6a, 6b rotate about the connecting axes between the pair of opposed second sandwiching plates 9a, 9b in a state of making both the side surfaces of the ends into contact with the pair of second sandwiching plates.

The sub arms 6a, 6b rotate in response to expansion and contraction of the expanding and contracting means 4, and at the time of rotation, friction resistance at the hinged portion of each sub arm end portion and each connecting axis can inhibit the downward movement of the screen. In particular, the sub arms 6a, 6b, the first connecting portion, and the second connecting portion have a structure of being connected by the four connecting axes and form a parallel link. The load of the screen is transmitted to the second connecting portion via the third arm, and the load is distributed to the sub arms 6a, 6b by fluctuation of the parallel link, thereby generating friction resistance at the hinged portions of the four connecting axes. Thus, a larger friction resistance can be generated than in a case of one sub arm. In this manner, the downward movement of the screen can be positively controlled. Further, as shown in FIG. 1, constituting each connecting portion by the pair of sandwiching plates generates a friction force between both the side surfaces of the end of each sub arm and the pair of first sandwiching plates or the pair of second sandwiching plates. Thus, the downward movement of the screen can be positively controlled.

In order to reinforce the sub arms, two or more sub arms may be connected by a link member so as to enable mutual parallel movement as needed. Although FIG. 1 shows an example of connecting two sub arms by a link member 25 at one side surfaces, two or more sub arms can be connected with use of a pair of link members at both side surfaces. In addition, the number of the link members is not particularly limited, but one or more members or one or more pairs can be used. The position to provide the link member is not particularly limited, and the link member can be provided at any position as long as the position is on the side surfaces of the sub arms, but the link member is preferably provided close to the height holding means. The shape and structure of the link member are not particularly limited as long as the link member can connect two or more sub arms so as to enable the sub arms to move parallel to each other.

Meanwhile, it is preferable to use a metal plate for the sandwiching plate and to provide a resinous end portion material at the end portion of the sub arm. A large friction force can be generated without generating a noise at the time of slide accordingly.

It should be noted that a height holding means may be provided to maintain the screen at a desired height more reliably. As shown in FIG. 1, the gas spring used as the height holding means 10 is engaged at its one end with the first arm 5 via a connecting part and is engaged at its other end with the sub arm 6a via a connecting part. The height holding means gives the expanding and contracting means an upward biasing force against the elastic force of a spring of the spring-biased roll and the load of the screen. The height holding means is not limited to the aforementioned gas spring as long as it can give the expanding and contracting means an upward biasing force, but another elastic means such as a coil spring can be used. In a case of using the coil spring, any method for giving a biasing force in directions in which the first arm 5 and the third arm 7 get away from each other is included within the scope of the present invention. For example, engaging one end of the coil spring with the connecting axis of the sub arm 6a and the second connecting portion 9 and engaging the other end of the coil spring with the connecting axis of the sub arm 6b and the first connecting portion 8 can give the expanding and contracting means an upward biasing force. In such a case, the coil spring must be engaged so as not to give an effect on a friction force between the sub arm and the connecting portion.

It should be noted that various modification examples for the height holding means are available other than the above, which are included within the scope of the present invention.

Figure 3:
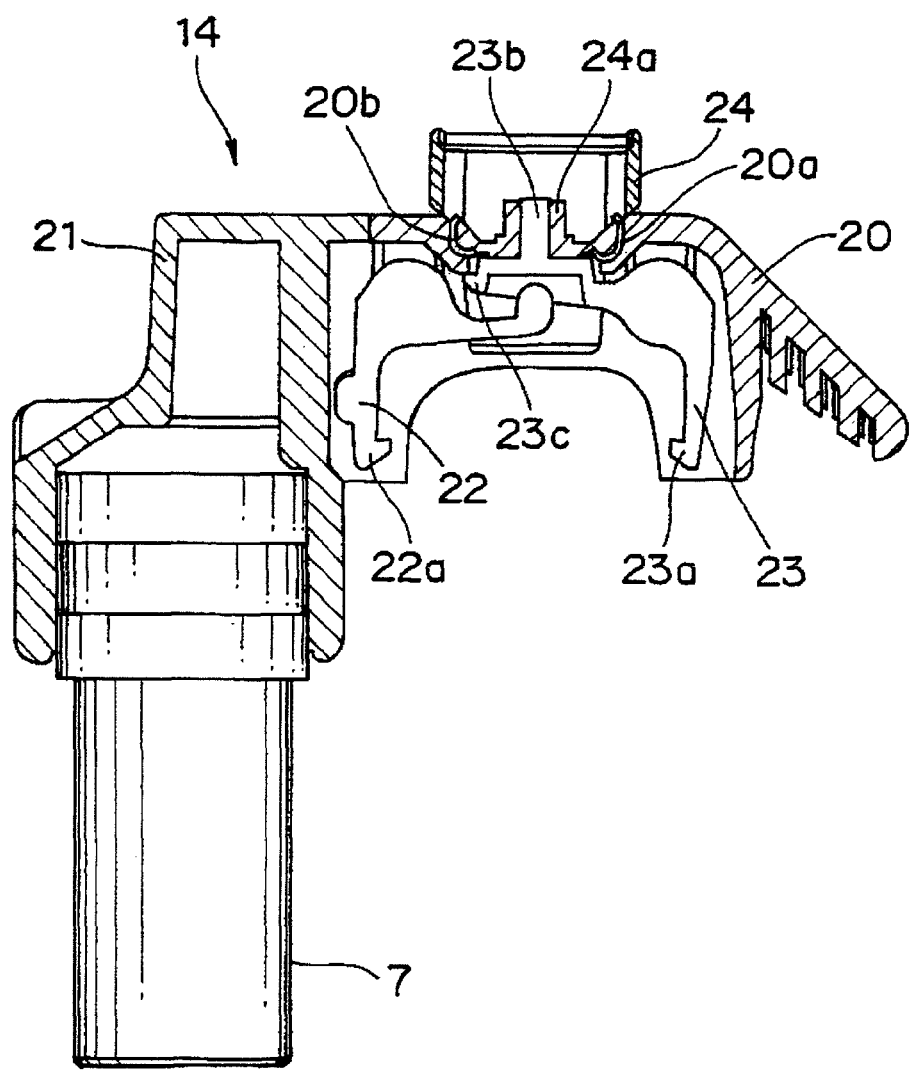
FIG. 3 is a schematic cross-sectional view showing an example of a structure of a mounting member used in the portable screen assembly in FIG. 1.

FIG. 3 is a schematic cross-sectional view showing an example of a structure of the mounting member 14. The mounting member 14 includes an mounting portion 21 to which one end of the third arm is rotatably supported, an engaging portion 20 engaged with the engaging member 15 for fixing the top bar provided at the intermediate portion of the casing 1, and a pivot lock 24. In the engaging portion 20, a pair of engaging members 22, 23 is arranged. The engaging portion 20 has opening edge portions 20a, 20b supporting a lock member 24a of the pivot lock 24 so as to rotate in the horizontal direction. The engaging member 23 on the projector side has at one end an engaging protrusion 23a engaged with the engaging member 15 and has at the other end a protrusion 23c which is in abutment with the opening edge portion 20b, and a fixing portion 23b fixed in the lock member 24a. The engaging member 22 on the back face side has at one end an engaging protrusion 22a engaged with a U-shaped member 11. The engaging members 22, 23 are biased by a spring member (not shown) in directions in which the engaging protrusion 23a and the engaging protrusion 22a come close to each other. In storing the screen, the engaging protrusion 23a is engaged with the engaging member 15 while the engaging protrusion 22a is engaged with the U-shaped member 11, and the top bar 2 is locked to the casing 1. When the pivot lock 24 is rotated to a locked position, a locked state in which the engaging protrusion 23a is biased in a top bar direction is held. On the other hand, when the pivot lock 24 is rotated to an unlocked position, the biasing force against the engaging protrusion 23a in the top bar direction is weakened, as a result of which the top bar can be detached from the casing.

Operations of the portable screen assembly according to the present invention will be described below.

When the assembly is not used, the expanding and contracting means 4 is folded, and the assembly is formed approximately in a rectangular shape and is extremely easy to store and carry. In this state, the screen 3 is completely wound around the spring-biased roll (not shown) by an elastic force of the spring (not shown) mounted to the spring-biased roll, and the plural arms constituting the expanding and contracting means 4 are completely folded and extend substantially parallel to the spring-biased roll.

When in use, the top bar 2 is pulled upward, whereupon the screen 3 is pulled out from the spring-biased roll 2 against the elastic force of the spring mounted to spring-biased roll and gravitational force.

A high pressure gas is enclosed in the gas spring through a piston having orifices and is designed to adjust any volumetric changes within the cylinder due to stretch and retract motion of the piston rod indirectly through oil or directly through changes in gas pressure. When the screen 3 moves downward, piston rod is compressed to generate a repulsive force of a gas pressure within the gas spring, thereby to inhibit downward movement of the screen 3 to a greater extent. The friction resistance at the hinged portion of each sub arm end portion and each connecting axis, the friction force between both the side surfaces of the end of each sub arm and the pair of first sandwiching plates or the pair of second sandwiching plates, and the upward biasing force by the gas spring can positively control the downward movement of the screen.

When the expanding and contracting means 4 almost completely folded, the repulsive force of the height holding means 10 against the elastic force and the gravitational force of the spring of the spring-biased roll may become lowered to cause the fall of the expanding and contracting means 4. However, the friction resistance at the hinged portion of each sub arm end portion and each connecting axis and the friction force between both the side surfaces of the end of each sub arm and the pair of first sandwiching plates or the pair of second sandwiching plates are effective in preventing a sudden fall of the expanding and contracting means 4. In particular, a contact area of the sub arm end portion with the sandwiching plate increases when the expanding and contracting means almost completely folded. In this manner, the friction force between the sub arm end portion and the sandwiching plate is increased, thereby reliably preventing a fall of the expanding and contracting means 4.

Meanwhile, without using the sandwiching plates, the hinged portion of the sub arm end portion and the connecting axis may be tightened to increase only the friction resistance at the hinged portion. However, if the hinged portion is tightened too much, the expanding and contracting means may not be able to elongate and contract smoothly. By using the sandwiching plates, the hinged portion can be prevented from being tightened excessively. Accordingly, the expanding and contracting means can extend and contract smoothly, and downward movement of the screen can be positively controlled.

Since the expanding and contracting means 4 is connected to the casing 1 and the top bar 2 only at the center portion, the screen 3 is balanced in the horizontal direction more easily than in a case where the expanding and contracting means 4 is connected to the casing 1 and the top bar 2 at two or more points.

Further, when in storing the screen 3, only by pressing the top bar 2 downward, the expanding and contracting means 4 moves downward slowly and is folded without falling, and the screen 3 is wound around the spring-biased roll and is stored in the casing.

Also, by using the gas spring of a free piston type containing oil in the cylinder, any possible falling of the expanding and contracting means during downward movement can be prevented more effectively. The free-piston type gas spring includes a piston having an orifice provided at the interior front end of the cylinder, such that when the expanding and contracting means goes closer to the completely folded condition, the piston rod of the gas spring is forced to move deep into the cylinder, whereupon the piston reaches the oil to press the oil, and then a rapid pressing of the rod is prevented. Thereafter, oil gradually passes the orifice, so that the rod is gradually pushed inward, and the expanding and contracting means is slowly folded.

Figure 5:
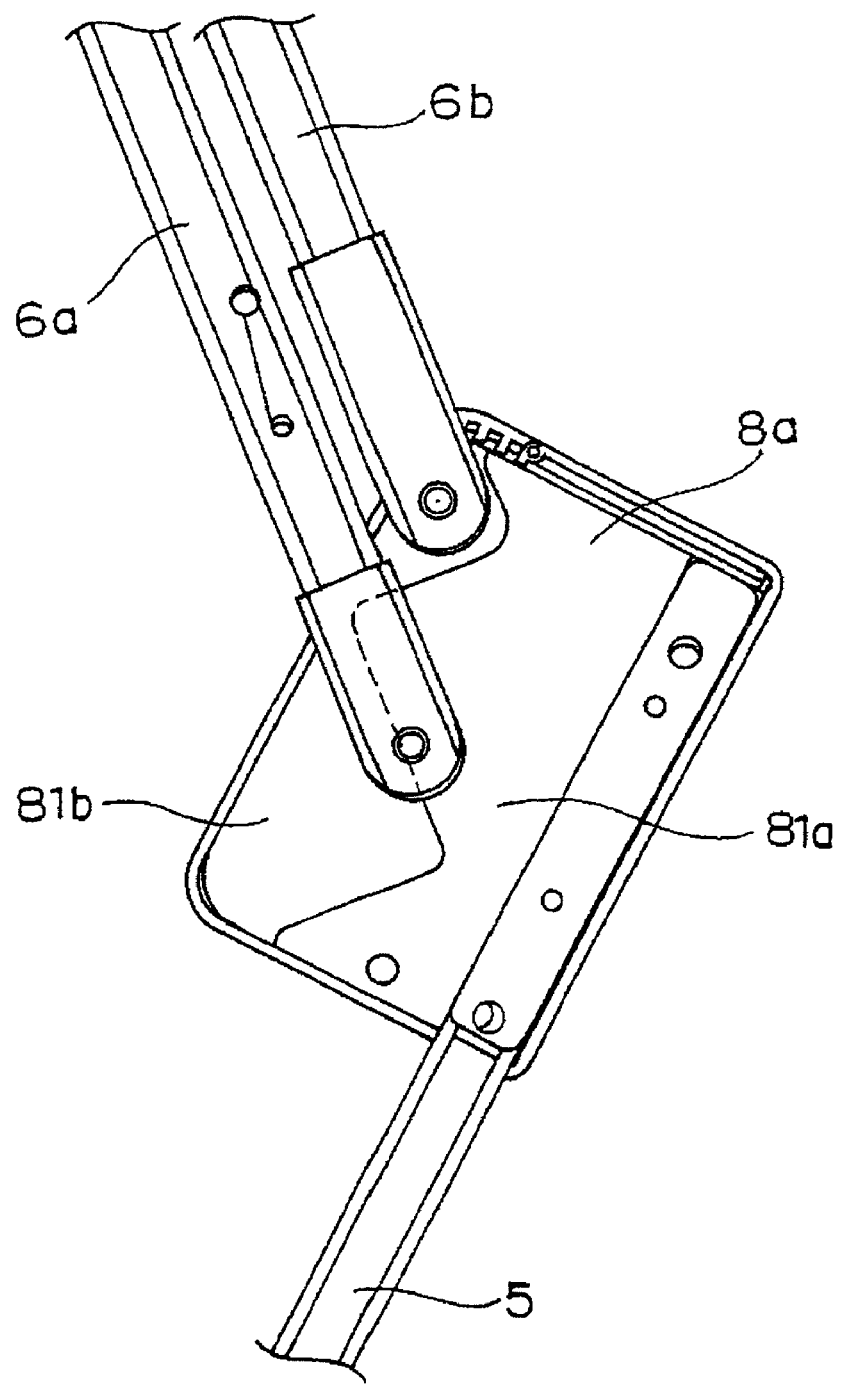
FIG. 5 is a schematic view showing another example of a structure of a connecting portion used in the portable screen assembly in FIG. 1.

Although the sandwiching plates having flat surfaces are used in the present embodiment, at least one of the first sandwiching plates and the second sandwiching plates may have a raised portion on the abutment surface with the sub arms so that one ends of the sub arms may abut on the raised portion to generate a friction force when in rotating the sub arms. FIG. 5 is a schematic view showing an example of the first sandwiching plates having a raised portion on the surface. On the surface of the sandwiching plate 8a, there are provided a base portion 81b and a raised portion 81a to generate the friction force in response to rotating the end portions of the sub arms 6a, 6b. When the expanding and contracting means is expanded, the friction resistance decreases along with pivoting the sub arms, and thus the expanding and contracting means can be expanded easily. On the other hand, when in the downward movement of the screen, the friction force increases, and thus the downward movement can be positively controlled. This raised portion can be formed by grinding the surface by a mechanical process.

Moreover, the surface of the sandwiching plate may be roughened. In a case where a sandwiching plate having a flat surface is used, a noise may occur along with increase of friction with the sub arms. However, this can be restricted by roughening the surface. Although the degree of roughness is not particularly limited, the surface roughness defined by arithmetic mean roughness Ra is preferably 0.5 $\mu$m to 10 $\mu$m and more preferably 1 $\mu$m to 5 $\mu$m, for example.

Figure 6:
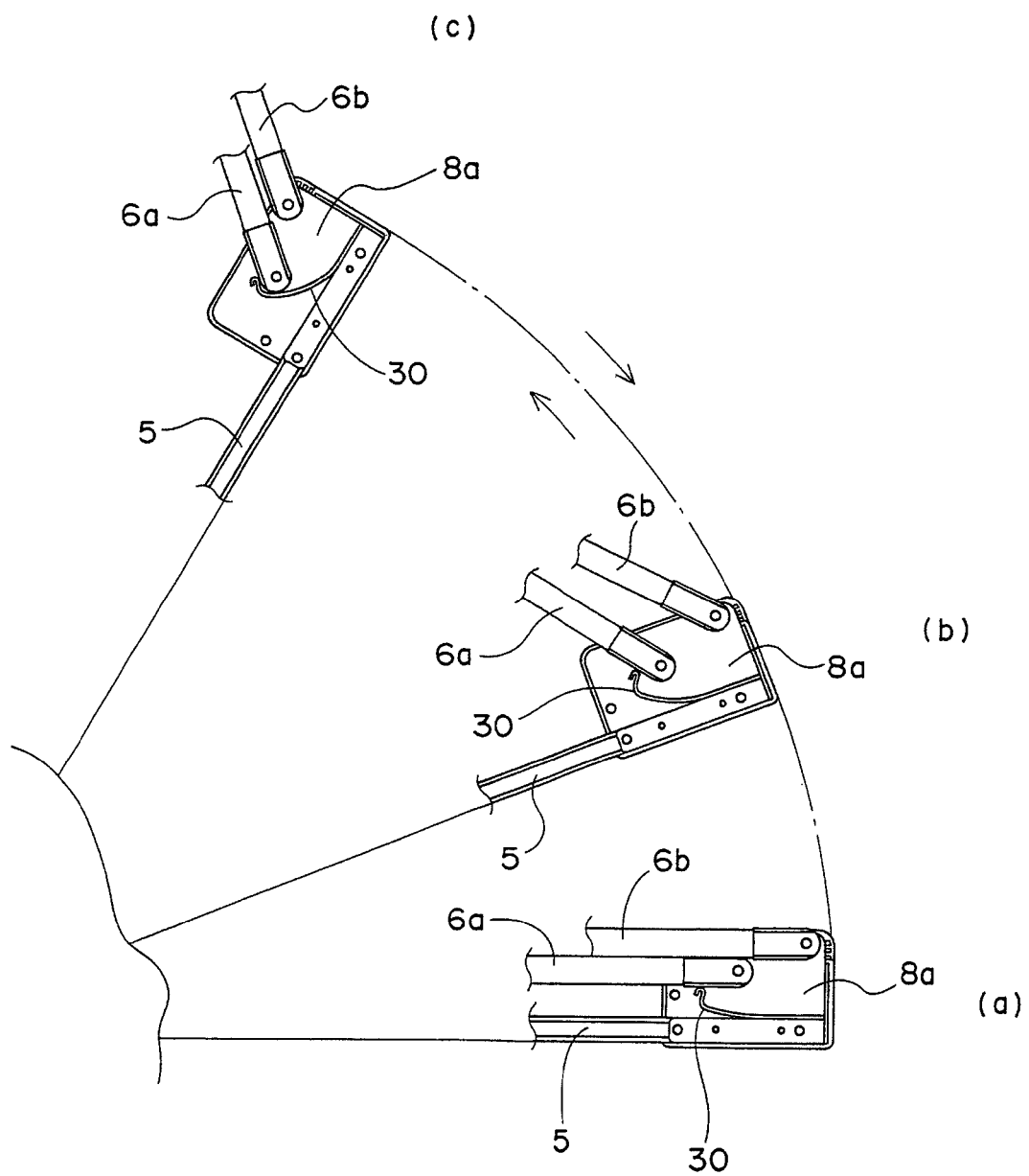
FIG. 6 is a schematic view showing another example of a structure of a connecting portion used in the portable screen assembly in FIG. 1.

Further, a buffer spring may be provided on the sandwiching plate so as to abut with one end portion of one of the sub arms. FIG. 6 is a schematic view showing an operation of a spring 30. As for the spring 30, one end is fixed to the sandwiching plate 8a while the other end is in abutment with the lower end portion of the sub arm 6a. In FIG. 6, (a) shows a state where the screen is stored, (c) shows a state where the screen is fully extended, and (b) shows a state where the screen is on the way of fully extended state. In the extended state in (c), the spring 30 inhibit downward movement of the sub arm by its elastic force. In the states in (a) and (b), the spring 30 inhibit sudden downward movement of the sub arm and absorbs shock at the time of downward movement. Although the shape of the spring is not particularly limited as long as the spring can abut with the lower end portion of the sub arm, a plate spring whose end portion to abut with the sub arm is preferably formed in a curved shape corresponding to the shape of the lower end portion of the sub arm. Using such a spring can control downward movement positively.

In the present embodiment, a case where the second arm includes the two sub arms has been described. However, providing three or more sub arms in accordance with the biasing force of the spring-biased roll and the weight of the screen can increase the friction resistance and control downward movement positively.

Second Embodiment

The present embodiment is structured in a similar manner to that of the first embodiment except that no connecting portion is used, and that one ends of the sub arms are rotatably connected to the first arm by separate connecting axes, respectively, while the other ends of the sub arms are rotatably connected to the third arm by separate connecting axes, respectively. In the present embodiment as well, friction resistance at the hinged portion of each sub arm end portion and each connecting axis can control downward movement positively. Accordingly, it is possible to provide a portable screen assembly that is easy to handle by enabling easy height adjustment of the screen and lowering the possibility of falling of the screen. Further, since no connecting portion is needed, further reduction in weight of the portable screen assembly can be achieved.

As the height holding means, a coil spring may be used in place of the gas spring. The coil spring may be attached inside the arm. For example, one ends of the sub arm 6a and the sub arm 6b may be respectively connected to one end of the first arm 5 while the other ends of the sub arm 6a and the sub arm 6b may be respectively connected to one end of the third arm 7 to form a parallel link. The coil spring may be provided inside the sub arm 6b or the first arm 5 so as to expand and contract in response to rotational movement of the sub arm 6b while the coil spring may be provided inside the sub arm 6a or the third arm 7 so as to expand and contract in response to rotational movement of the sub arm 6a.

As described above, according to the present invention, it is possible to provide a portable screen assembly that is lighter in weight and easier to handle since the number of parts can be further reduced than in the case of using a conventional expanding and contracting means having a pantograph structure.

What is claimed is:

1. A portable screen assembly comprising:
a casing;
a spring-biased roll rotatably mounted to the casing;
a screen bonded at one end thereof to a top bar and wound around the spring-biased roll in storage and pulled out in an upward direction from the spring-biased roll against the elastic force of a spring mounted to the spring-biased roll and gravitational force when the top bar is pulled upward in use; and
an expanding and contracting means having one end rotatably mounted to an mounting member mounted to the top bar and the other end rotatably mounted to the casing, wherein:
the expanding and contracting means is a half-pantograph type expanding and contracting means having a first arm, a second arm, and a third arm arranged in an extended plane parallel to the extended screen, the second arm including two or more mutually parallel sub arms provided to be mutually parallel in the extended plane, the two or more sub arms being connected to the first arm and the third arm so as to form a parallel link;
one end of the second arm of the expanding and contracting means is rotatably connected to a first connecting portion in which one end of the first arm is secured, and the other end of the second arm is rotatably connected to a second connecting portion in which one end of the third arm is secured, and one end of the sub arms are rotatably connected to the first connecting portion by separate connecting axes, respectively, and the other ends of the sub arms are rotatably connected to the second connecting portion by separate connecting axes, respectively;
the first connecting portion includes a pair of first sandwiching plates parallel to each other for sandwiching both side surfaces of one end of the first arm, and the second connecting portion includes a pair of second sandwiching plates parallel to each other for sandwiching both side surfaces of one end of the third arm, when in rotating the sub arms, one end of the sub arms abut onto the sandwiching plates to generate a friction force;
the expanding and contracting means has a height holding means engaged with a part of the expanding and contracting means; and
the height holding means is a gas spring having one end engaged with the second arm and the other end engaged with the first arm and generating upward biasing force.

2. The assembly according to claim 1, wherein at least one of the first sandwiching plates and the second sandwiching plates has a raised portion on an abutment surface with the sub arms, when in rotating the sub arms, one ends of the sub arms abut onto the raised portion to generate a friction force.

3. The assembly according to claim 1, wherein the two or more sub arms are connected by a link member so as to enable mutual parallel movement.

4. The assembly according to claim 1, wherein one end of the second arm of the expanding and contracting means is rotatably connected to one end of the first arm, and the other end of the second arm is rotatably connected to one end of the third arm, and
one ends of the sub arms are rotatably connected to the first arm by separate connecting axes, respectively, and the other ends of the sub arms are rotatably connected to the second arm by separate connecting axes, respectively.

5. The assembly according to claim 4, wherein the expanding and contracting means has a height holding means engaged with a part of the expanding and contracting means.

6. The assembly according to claim 5, wherein the height holding means is a gas spring having one end engaged with the second arm and the other end engaged with the first arm.

7. The assembly according to claim 6, wherein the two or more sub arms are connected by a link member so as to enable mutual parallel movement.

8. The assembly according to claim 1, wherein one end of the second arm of the expanding and contracting means is rotatably connected to a first connecting portion in which one end of the first arm is secured, and the other end of the second arm is rotatably connected to a second connecting portion in which one end of the third arm is secured, and
the other end of the first arm is rotatably mounted to a supporting member at an intermediate portion of the casing while the other end of the third arm is rotatably mounted to the mounting member mounted to an intermediate portion of the top bar, and when storing the screen, the mounting member is engaged with the casing to lock the top bar to the casing.

9. The assembly according to claim 8, wherein the supporting member is provided on a back face side at the intermediate portion of the casing while an engaging member is provided on a front face side at the intermediate portion of the casing, and the mounting member is engaged with the supporting member and the engaging member to lock the top bar to the casing.

10. The assembly according to claim 8, wherein the first connecting portion includes a pair of first sandwiching plates parallel to each other for sandwiching both side surfaces of one end of the first arm, and the second connecting portion includes a pair of second sandwiching plates parallel to each other for sandwiching both side surfaces of one end of the third arm.

11. The assembly according to claim 8, wherein the expanding and contracting means has a height holding means engaged with a part of the expanding and contracting means.

12. The assembly according to claim 11, wherein the height holding means is a gas spring having one end engaged with the second arm and the other end engaged with the first arm.

* * * * *